United States Patent [19]

Meacheam

[11] 3,999,589
[45] Dec. 28, 1976

[54] APPARATUS FOR PRODUCING TIRE TREAD PATTERNS

[75] Inventor: Gregory John Meacheam, Birmingham, England

[73] Assignee: Dunlop Limited, London, England

[22] Filed: Apr. 21, 1975

[21] Appl. No.: 570,263

[30] Foreign Application Priority Data

Apr. 26, 1974 United Kingdom ............ 18312/74

[52] U.S. Cl. .............................................. 157/13
[51] Int. Cl.² ...................................... B29H 21/08
[58] Field of Search ............... 30/140; 82/11; 83/5; 157/13

[56] References Cited
UNITED STATES PATENTS

| | | | |
|---|---|---|---|
| 2,765,846 | 10/1956 | Ellis | 157/13 |
| 2,995,183 | 8/1961 | Love | 157/13 |
| 3,044,536 | 7/1962 | Brown | 157/13 |
| 3,075,575 | 1/1963 | Orenduff | 157/13 |
| 3,502,131 | 3/1970 | Rawls | 157/13 |
| 3,537,502 | 11/1970 | Napolitano | 157/13 |

*Primary Examiner*—Al Lawrence Smith
*Assistant Examiner*—James G. Smith
*Attorney, Agent, or Firm*—Stevens, Davis, Miller & Mosher

[57] ABSTRACT

An apparatus for cutting a tread pattern on a tire consisting of means to permit the direction of cut of a power driven cutting means to be varied and the cutting means to be tilted to follow the curvature of the tread of the tire.

14 Claims, 10 Drawing Figures

APPARATUS FOR PRODUCING TIRE TREAD PATTERNS

This invention relates to an apparatus for cutting a tread pattern on a tire, particularly, but not exclusively, for use in cutting a tread pattern on a large tire such as an earthmover tire.

According to the invention an apparatus for cutting a tread pattern on a tire comprises means to support a tire in position with its rotational axis aligned in a predetermined direction cutting means to cut rubber from the tread of a tire a carriage for said cutting means a support assembly for said carriage means incorporated in the carriage to move the cutting means relative to the carriage the support assembly being carried on a framework provided with means to adjust the position of the support assembly relative to the tire support to offer the cutting means to the tread of a tire positioned on said tire support the cutting means being pivotally mounted on its carriage, the carriage for the cutting means being pivoted about two mutually perpendicular axes, at least one of which is perpendicular to the rotational axis of a tire when in position on the tire support means, to permit the direction of cut of the cutting means to be varied and the cutting means to be tilted to follow the curvature of the tread of a tire so positioned.

The apparatus of this invention may be utilized to cut a tread pattern in the tread of a tire e.g. a giant or earthmover tire which has been prepared with a plain tread e.g. during remolding or new tire manufacture.

Preferably the apparatus is used to cut a pattern in the tread whilst the tread is still uncured so that the rubber cut from the tread may be used again. A plain uncured tread may be built up on a carcass either by winding on to the carcass a large number of turns of a narrow strip or strips of uncured rubber, or by arranging a single, full width layer of uncured rubber around the prepared tire carcass.

In the apparatus of this invention the cutting means is preferably a heated, knife blade shaped to cut a groove of the desired cross-sectional shape. Such blades are conveniently heated electrically by passage of a high current at a low voltage.

An embodiment of the apparatus of this invention will now be described in more detail, by way of example only, with reference to the accompanying drawings in which.

Figure 1:
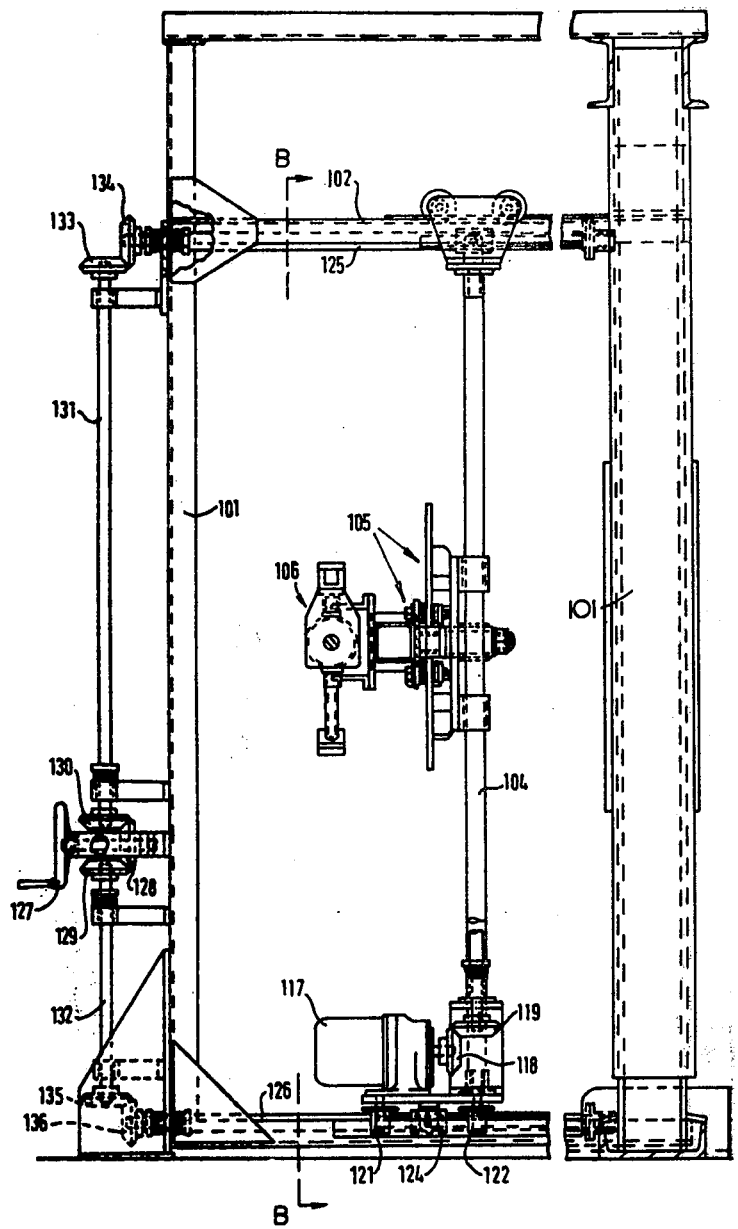
FIG. 1 is a sectional elevation of the apparatus on the line A—A of FIG. 2.
Figure 2:
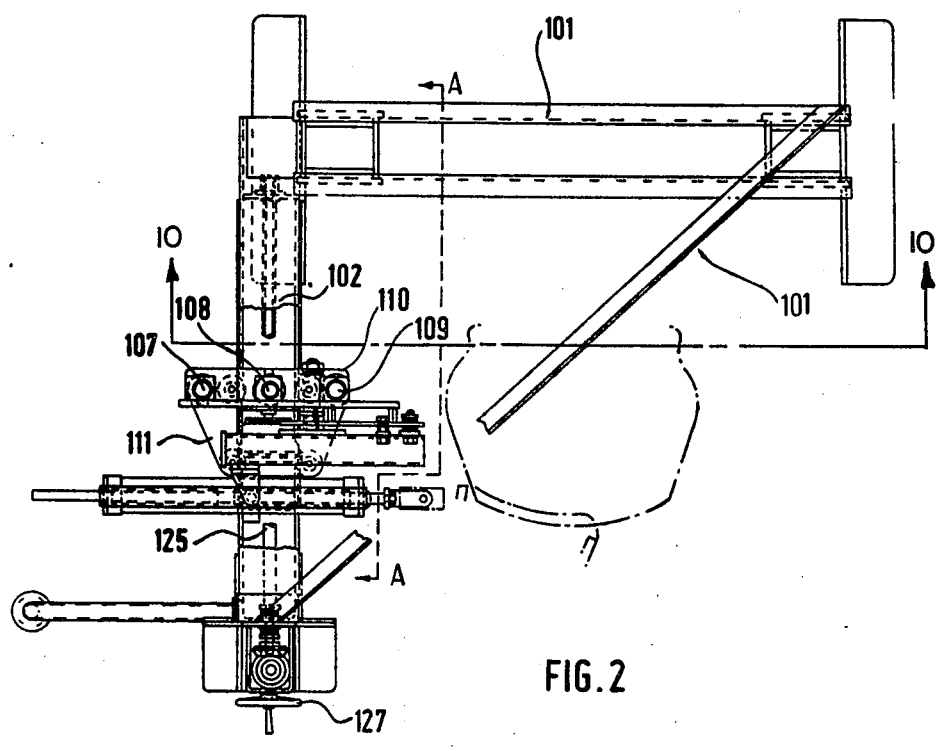
FIG. 2 is a plan view of the apparatus with some parts omitted for the purpose of clarity.

As shown in FIGS. 1 and 2 the apparatus consists of a framework 101 supporting a cross beam 102 between which and the base 103 of the framework extends a secondary frame 104. A support assembly 105 for a carriage 106 for a knife (not shown) is mounted on the secondary frame 104.

Figure 3:
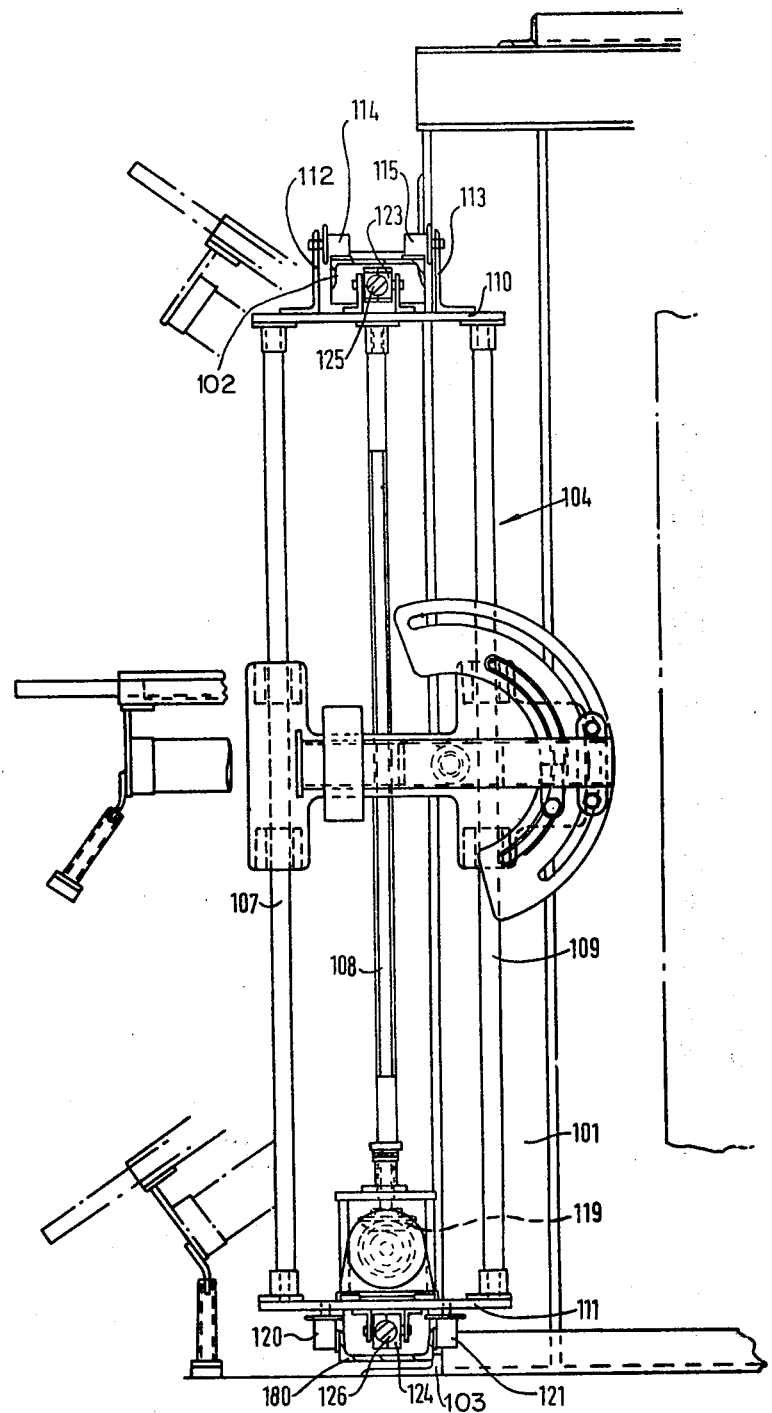
FIG. 3 is a sectional elevation of the apparatus on line B—B of FIG. 1.

As best seen in FIG. 3 the cross beam 102 has an inverted shallow 'U'-shaped cross-section and the base 103 of the framework carries a similar beam 180 of shallow 'U'-shaped cross-section. The secondary frame 104 takes the form of a carriage which is mounted between the beams 102 and 180 which act as guides along which the frame 104 is movable.

The frame 104 consists of three vertical rods 107, 108 and 109 extending between two cross pieces 110 and 111. The upper cross-piece 110 carries a pair of upwardly extending side plates 112 and 113 which each carry two rollers 114, 115, 116, (one roller not shown) which run on the upper surface of the cross-beam 102. The lower cross-piece 111 is in the form of a horizontal plate which carries an electric motor 117 whose purpose is to rotate, through suitable bevel gears 118, 119, the central rod 108 of the frame 104 which is rotatably mounted and is provided with an external screw thread along the centre portion of its length. Beneath the lower cross-piece 111 are provided four downwardly extending rollers 120, 121, 122 (one not shown) which engage the outer surfaces of the upwardly extending sides of the beam 180 to guide the frame 104. The two cross-pieces 110 and 111 are fixed to blocks 123, 124 which have an internal screw thread. These screw-threaded blocks are mounted on externally screw-threaded rods 125 and 126 on the framework 101 so that the secondary frame 104 can be moved bodily along the framework by rotation of the rods 125 and 126. Provision is made to rotate these rods simultaneously by means of a handle 127 on the framework which is connected through gears 128, 129, 130, to rotate a pair of rods 131, 132 which are correspondingly connected through pairs of gears 133, 134 and 135, 136 to the rods 125 and 126.

Figure 4:
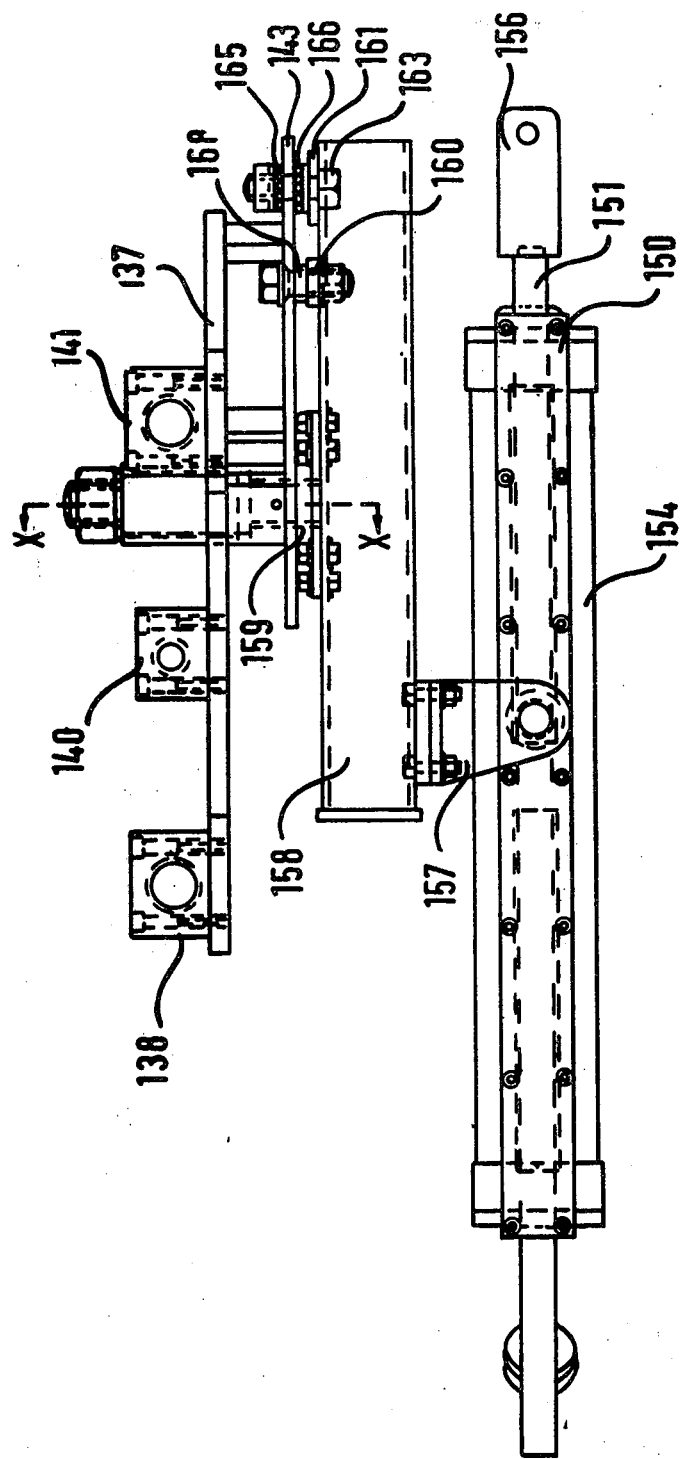
FIG. 4 is a detail plan view of a portion of the apparatus.
Figure 5:
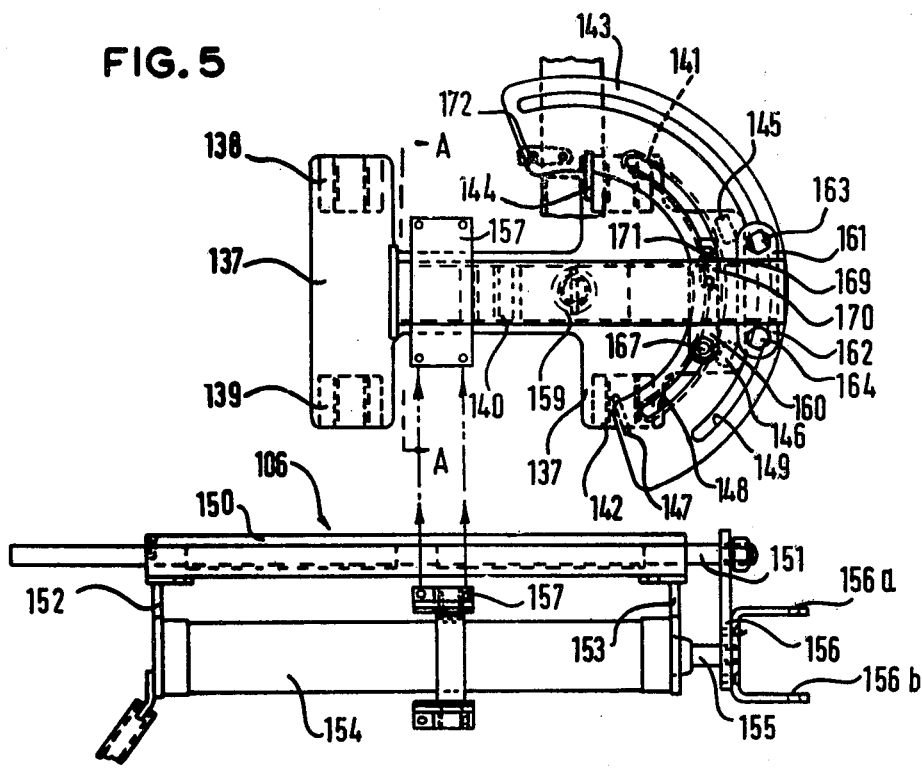
FIG. 5 is a front elevation of the portion of the apparatus shown in FIG. 4.
Figure 6:
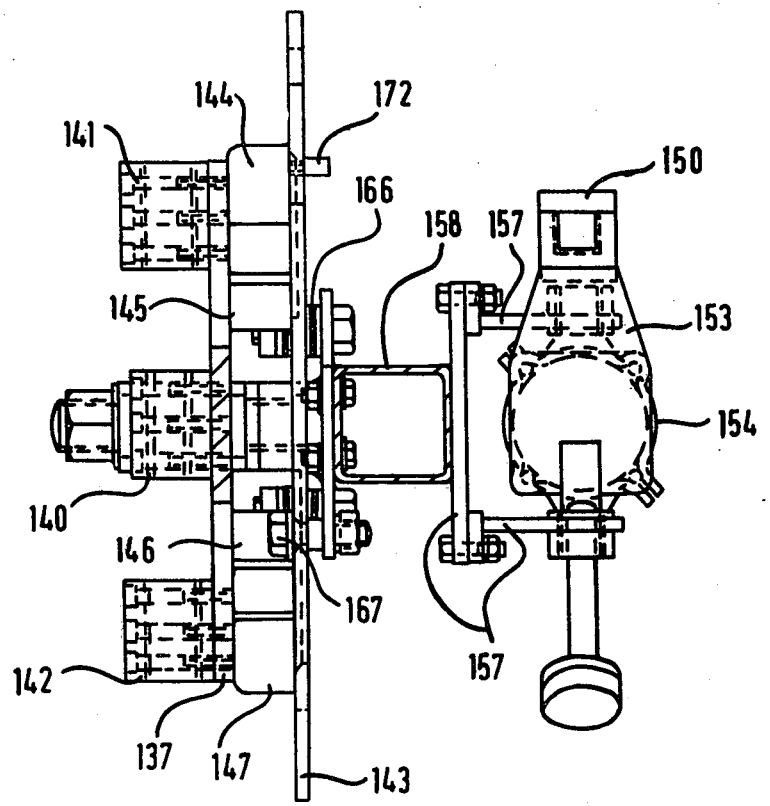
FIG. 6 is an end sectional elevation on line A—A of FIG. 5, FIGS. 7, 8 and 9 are three views of a knife blade suitable for use with the apparatus shown in the other Figures.

As shown in FIGS. 4, 5 and 6, the support assembly 105 for the knife carriage 106 comprises a backplate 137 mounted on the three rods 107, 108 and 109 of the secondary frame by means of five blocks 138, 139, 140, 141 and 142. The blocks 138 and 139 are a sliding fit on the rod 107 and the blocks 141 and 142 fit similarly on the rod 109. The block 140, however, is internally screw-threaded and engages the externally screw-threaded rod 108. Thus the support assembly 105 can be moved vertically on the secondary frame 104 by means of the motor 117.

An arcuate plate 143 is attached to the backplate 137 and yet spaced from it by means of blocks 144, 145 and 146 and 147. The plate 143 contains two arcuate slots 148 and 149.

The knife carriage 106 includes a sleeve 150, for a guide rod 151 attached through end pieces 152 and 153 to a piston and cylinder 154 parallel to the sleeve 150. The piston rod 155 and the guide rod 151 are each attached to a bracket 156 in which a suitable knife (not shown) is to be pivotally mounted. Thus actuation of the piston and cylinder 154 will move the knife mounting bracket, and hence the knife, away from the carriage guided by the piston rod 155 and the guide rod 151 sliding in the sleeve 150.

The carriage 106 is pivotally mounted via the casing of the piston and cylinder assembly on a bracket 157 attached to a length of square section tube 158 at a position adjacent one end of the tube. The length of tube acts as an arm and is attached to a bracket 159 which is pivotally mounted on the backplate 137. The axis X—X of this pivot is perpendicular to the rotational axis of a tire held by the tire support means.

At the opposite end of the tube 158 from the bracket 157 three lugs 160, 161 and 162 are provided in a plane parallel with the plane of the arcuate plate 143. The lugs are made by welding strips of heavy gauge steel to the back of the tube 158. Two nuts and bolts 163 and 164 extend through the lugs 161 and 162 and through the arcuate slot 149 to act as guides during rotation of the tube about the pivot axis X—X which is positioned at the centre of curvature of the arcuate slots 148 and 149 in the plate 143. The two nuts and bolts 163 and 164 each sandwich the plate 143 between a pair of bearings 165 and 166 (see FIG. 4) to ensure that they do not impede rotation about the pivot X—X.

A third nut and bolt 167 passes through the lug 160 and the arcuate slot 148. This nut and bolt carries a spacer washer 168 between the plate 143 and the lug 160 and its function is to clamp the square tube in a fixed angular position to stop rotation about the pivot X—X.

A short arm 169 is pivotally mounted on the back of the tube 158 adjacent the lug 160 and spring-loaded by a spring 170 to a position at right angles to the length of the tube 158. The edge of the arm 169 opposite the spring 170 is provided with a slot 171 and a corresponding projection 172 is provided on the plate 143. The slot 171 may be engaged upon the projection 172 to hold the tube 158 in a "parked" position when not in use.

In operation the function of the apparatus is as follows. The tire is positioned in the apparatus on the tire support means. The outline of the tire so positioned is shown in FIGS. 2 and 3. Firstly the support assembly is moved vertically on the frame 104 through rotation of the rod 108 by motor 117 to bring the knife carriage to the correct height. Then the whole frame 104 is moved horizontally towards the tire by rotation of the threaded rods 125 and 126 to position the knife carriage adjacent the shoulder of the tire as shown in FIG. 2.

The angle of cut required may be adjusted by slackening the nut and bolt 167, and rotating the knife carriage on its support arm i.e. the square section tube 158 about the pivot X—X to the desired angle. The nut and bolt 167 is then re-tightened to clamp the knife carriage support arm at this angle.

To cut a groove in the tire the knife blade mounted on the knife carriage bracket 156 is first heated. The knife blade is a known type of assembly in which the heated blade is a loop of strip metal, shaped to a desired groove cross-section, and is provided with a guard to prevent the blade digging deeper into the tire than the desired groove depth.

The knife blade is positioned manually against the tire shoulder, the piston and cylinder assembly 154 actuated to provide the driving force for the knife blade and the blade is guided manually across the tire tread to keep a constant groove depth the pivotal mountings on brackets 156 and 157 permitting the knife blade to follow the tire tread contour. The tire is held stationary during this operation by the tire support means and is moved round step by step after each cut. Generally the grooves are cut only to, or just over the tread center line, as indicated in FIG. 2, the tire being turned after one side of the tread has been cut.

In an alternative pendulum mode of operation (not illustrated) if arcuate grooves are desired the knife blade may be attached by a flexible or solid linkage to an upper cross-piece of the main frame 101. The nut and bolt 167 is removed or left slack so that free movement is possible about all the three pivots in the knife blade carriage and support assembly.

The mode of cutting is the same as before except that the pendulum arrangement will now control the cut to the desired radius.

Figure 7:
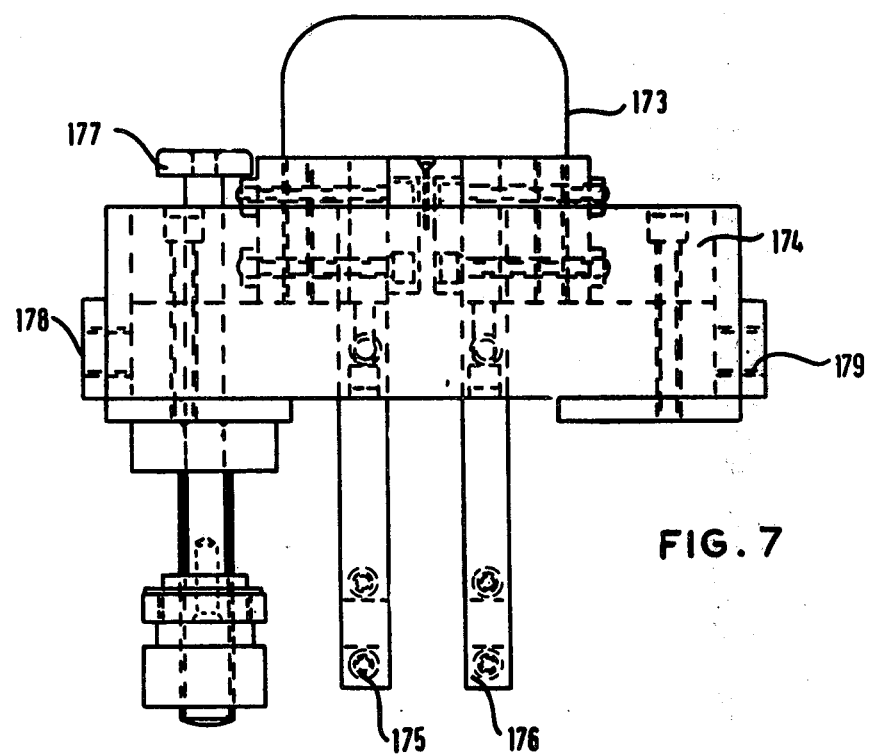
Figure 8:
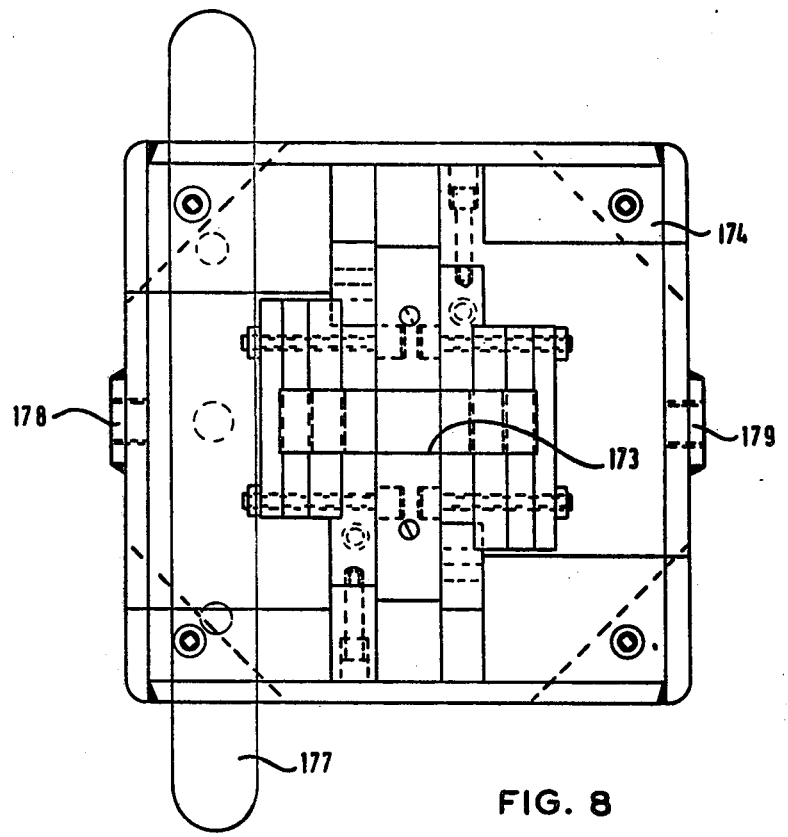
Figure 9:
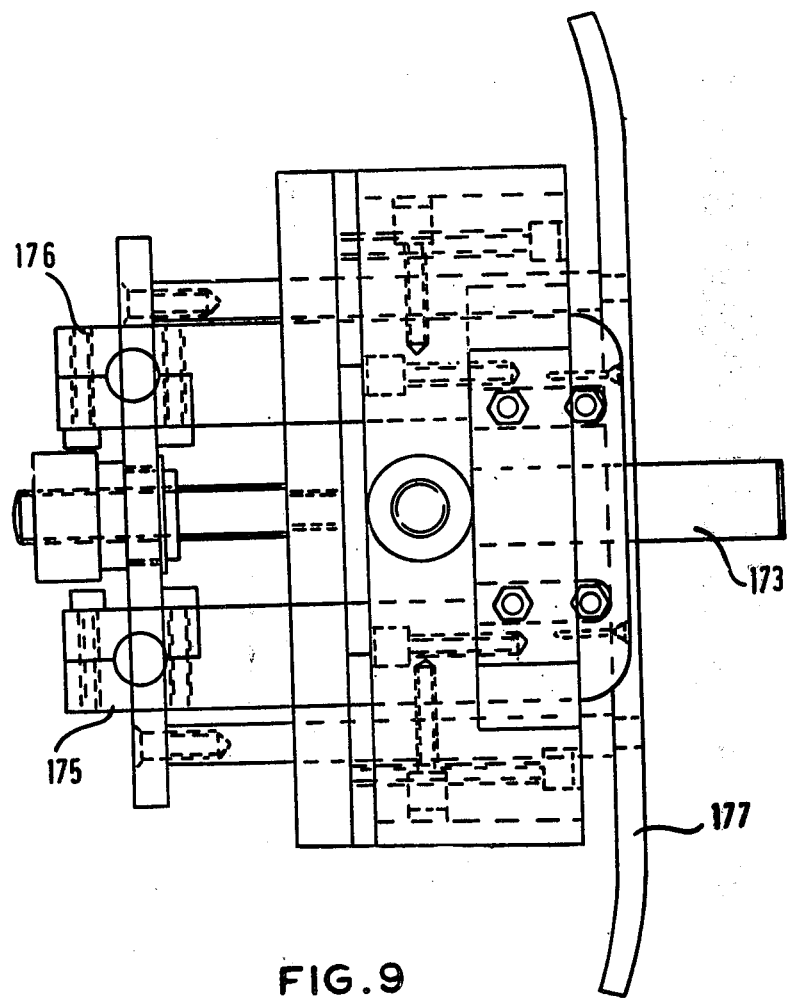

The knife blade shown in FIGS. 7, 8, and 9 consists of a flat strip 173 of metal alloy, curved to a desired shape as shown in FIG. 7, and mounted in a body 174 incorporating insulating material. Two terminals 175, 176 are provided to permit the blade to be connected to a power source for electrical heating purposes. A guide 177 is adjustably mounted in the body 174 to act as a control for depth of cut. The knife blade is attached to the bracket 156 on its carriage by aligning the holes 156a, 156b, 178 and 179 and positioning a suitable rod (not shown) therethrough.

Figure 10:
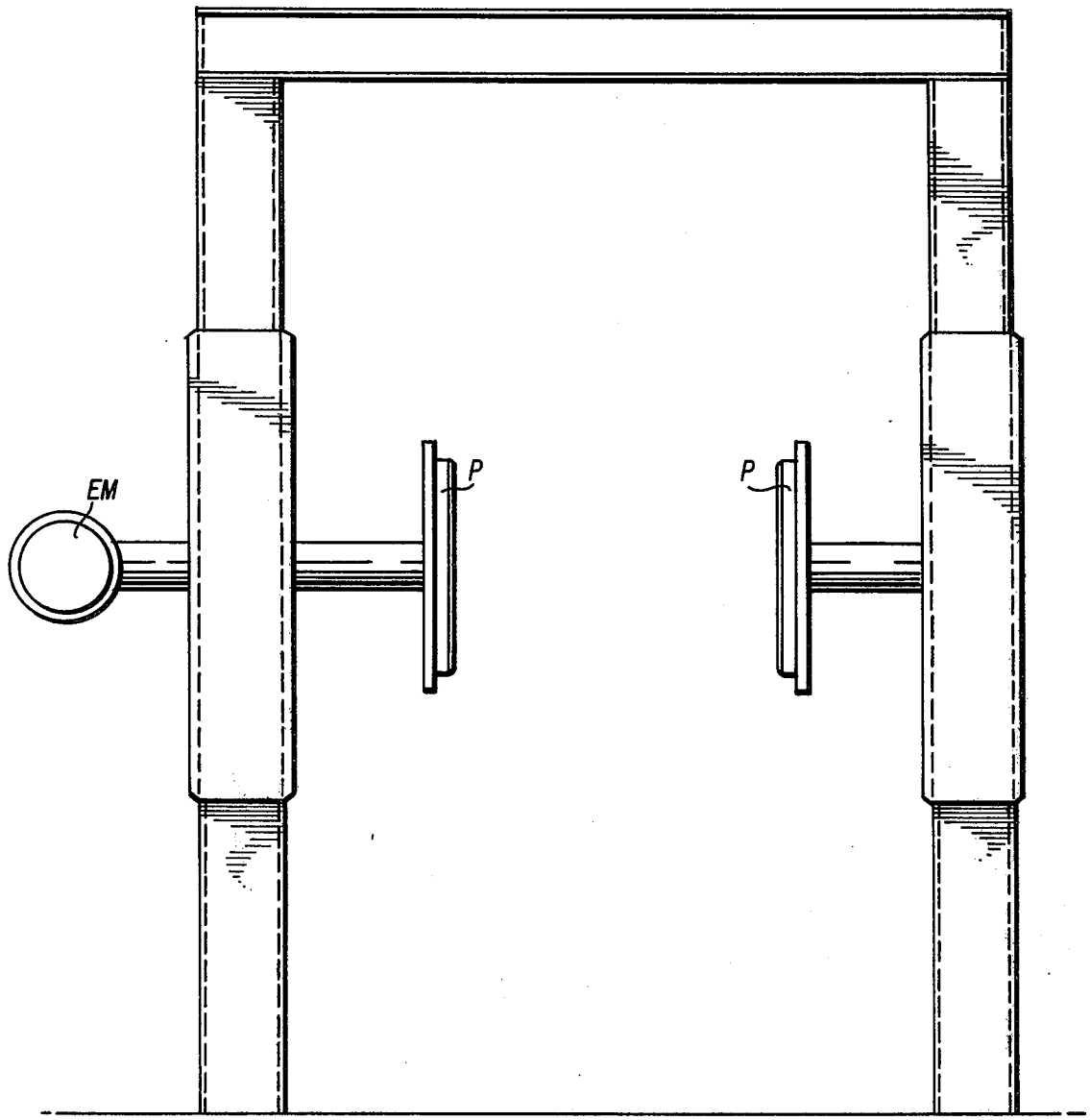
FIG. 10 is a sectional elevation taken along line 10—10 of FIG. 2.

The tire support means mentioned earlier consists simply of a pair of side plates $p, p$ (FIG. 10) which can be brought up one against each tire bead to support the tire and form a seal therewith to permit the tire to be inflated. The tire so gripped can be rotated with the plates by means of an electric motor EM.

Having now described my invention, what I claim is:

1. An apparatus for cutting a tread pattern on a tire comprising means to support a tire in position with its rotational axis aligned in a predetermined direction, cutting means to cut rubber from the tread of a tire, a carriage for said cutting means, means incorporated in said carriage to move the cutting means relative to the carriage, a support assembly on which said carriage is movably supported, the support assembly being carried on a framework provided with means to adjust the position of the support assembly relative to the tire support to offer the cutting means to the tread of a tire positioned on said tire support, the cutting means being pivotally mounted on its carriage, the carriage for the cutting means being pivoted about two mutually perpendicular axes, at least one of which is perpendicular to the rotational axis of a tire when in position on the tire support means, to permit the direction of cut of the cutting means to be varied and the cutting means to be tilted to follow the curvature of the tread of a tire so positioned.

2. An apparatus according to claim 1 in which the means to support a tire in position with its rotational axis aligned in a predetermined direction comprises a pair of side plates, one against each tire bead to support a tire and form a seal therewith to permit a tire to be inflated.

3. An apparatus according to claim 2 in which a tire thus supported can be rotated with the plates by means of an electric motor.

4. An apparatus according to claim 1 in which the cutting means comprises a heated knife blade.

5. An apparatus according to claim 1 in which the cutting means is heated electrically.

6. An apparatus according to claim 1 in which the cutting means is provided with a guard in order to prevent said cutting means digging too deep into the tread of a tire.

7. An apparatus according to claim 1 in which the carriage for the cutting means includes a sleeve for a guide rod which is attached to a bracket in which said cutting means is to be pivotally mounted.

8. An apparatus according to claim 1 in which the support assembly is movable vertically on a frame by a motor to the required height.

9. An apparatus according to claim 8 in which the support assembly is moved vertically on the frame by means of a threaded rod which is rotated through bevel gears by the motor 10. An apparatus according to claim 7 in which means to move the bracket in which said cutting means is to be pivotally mounted relative to the support assembly comprises a piston and cylinder attached to the sleeve thereof and parallel to said sleeve, the piston and guide rod each being attached to the bracket.

11. An apparatus according to claim 1 in which a piston and cylinder are pivotally mounted by means of a bracket on an arm member of the support assembly, the pivotal axis being parallel to the pivotal axis of the mounting of a knife in the bracket to permit, in operation, the knife to follow the curve of the tire tread.

12. An apparatus according to claim 11 in which the arm member of the support assembly is pivotally mounted on a back plate of said support assembly, its pivotal axis perpendicular to the rotational axis of the tire, whereby the angle of cut relative to the mid-circumferential plane of the tire may be varied.

13. An apparatus according to claim 12 in which the arm member is slidably clamped to a guide plate by means of bolts engaging an arcuate slot in said guide plate, rotation of the arm member being permitted by movement of the bolts along said slot by virtue of the provision of bearings on the clamping surfaces engaging said guide plate.

14. An apparatus according to claim 13 in which clamping means is also provided to secure the arm member to the guide plate against rotation about its pivot to enable the angle of cut of the knife to be set at a predetermined value.

* * * * *